United States Patent
Takeuchi et al.

(10) Patent No.: US 7,660,995 B2
(45) Date of Patent: Feb. 9, 2010

(54) ACCESS CONTROL SYSTEM, AUTHENTICATION SERVER, APPLICATION SERVER, AND PACKET TRANSMISSION DEVICE

(75) Inventors: Keisuke Takeuchi, Kunitachi (JP); Shuji Senoo, Tokyo (JP)

(73) Assignee: Hitachi, Ltd., Tokyo (JP)

(*) Notice: Subject to any disclaimer, the term of this patent is extended or adjusted under 35 U.S.C. 154(b) by 917 days.

(21) Appl. No.: 11/202,286

(22) Filed: Aug. 12, 2005

(65) Prior Publication Data

US 2006/0080542 A1    Apr. 13, 2006

(30) Foreign Application Priority Data

Oct. 12, 2004   (JP)   ............... 2004-297122

(51) Int. Cl.
*G06F 21/00* (2006.01)
(52) U.S. Cl. .......................... 713/182; 726/2
(58) Field of Classification Search ................. 713/182; 726/2
See application file for complete search history.

(56) References Cited

U.S. PATENT DOCUMENTS

| | | | |
|---|---|---|---|
| 7,386,889 B2* | 6/2008 | Shay | 726/26 |
| 7,503,065 B1* | 3/2009 | Packingham et al. | 726/12 |
| 2006/0037063 A1* | 2/2006 | Clemmons et al. | 726/4 |
| 2006/0156017 A1* | 7/2006 | McIsaac et al. | 713/182 |
| 2006/0294387 A1* | 12/2006 | McCracken et al. | 713/182 |

FOREIGN PATENT DOCUMENTS

JP    2003-132030    10/2001

OTHER PUBLICATIONS

Fielding, R. et al., Hypertext Transfer Ptotocol—HTTP/1.1, Network Working Group, (Jun. 1999), pp. 1-159.

* cited by examiner

*Primary Examiner*—Kambiz Zand
*Assistant Examiner*—Amare Tabor
(74) *Attorney, Agent, or Firm*—Stites & Harbison PLLC; Juan Carlos A. Marquez, Esq.

(57) ABSTRACT

A system for preventing spoofing to use a service provided on a network. The system holds correlation between a first identifier used by a user of a service provided on a network for first authentication for permitting a user to make connection to the network and a second identifier used for second authentication for permitting the user to use a service, holds correlation between a third identifier assigned to the user permitted to make connection to the network and the first identifier of the user, and checks the correlation between the second identifier and the third identifier contained in the packet for the second authentication.

10 Claims, 12 Drawing Sheets

FIG. 2

| ID | IP address |
|---|---|
| user1 | 192.168.1.1 |
| user2 | |
| user3 | 192.168.1.2 |
| ⋮ | ⋮ |

FIG. 3

| ID | Password |
|---|---|
| user1 | ************ |
| user2 | ************ |
| user3 | ************ |
| ⋮ | ⋮ |

FIG. 4

| Network user ID | Web service user ID |
|---|---|
| user1 | alice |
| user2 | bob |
| user3 | carol |
| ⋮ | ⋮ |

| ID | Password |
|---|---|
| alice | ************ |
| bob | ************ |
| carol | ************ |
| ⋮ | ⋮ |

451, 452, 453

ACCESS CONTROL SYSTEM, AUTHENTICATION SERVER, APPLICATION SERVER, AND PACKET TRANSMISSION DEVICE

INCORPORATION BY REFERENCE

The present application claims priority from Japanese application JP 2004-297122 filed on Oct. 12, 2004, the content of which is hereby incorporated by reference into this application.

BACKGROUND OF THE INVENTION

The present invention relates to an access control method, system, device, program, and a recording medium and in particular, to a method, system, device, program, and a recording medium for performing access control to a service provided via a network.

Currently, various services are provided in networks such as the Internet and an enterprise network (Intranet). When using a service on a network, a user firstly connects a terminal device to the network. For this, permission for connection by the operation administrator of the network may be required. Here, the network operation administrator authenticates the user for judging whether to permit connection. For example, in order to connect to the Internet, permission for connection should be received by the ISP (Internet Service Provider). Here, the authentication is performed by inputting an identifier for identifying the ISP user and a password for confirming that the user identified by it is the user himself/herself by using, for example, the PPP (Point-to-Point Protocol) (for the PPP, see "The Point-to-Point Protocol (PPP)", RFC1661, IETF.)

As another example, when making connection to the Intranet in an enterprise, permission for connection may be required. Here, authentication is performed by inputting an identifier for identifying the Intranet user and a password by using, for example, IEEE 802.1x.

On the other hand, among services provided on the network, there are such services which are provided to particular users or which have different contents to be provided to respective users. In such services, a user is identified for assigning a use authority and the user should be authenticated by the service provider. Here, the authentication is performed by inputting an identifier for identifying a service user and a password by using a protocol positioned on the upper node layer of the OSI reference model such as the HTTP (Hyper Text Transfer Protocol), for example, (for the HTTP, see "Hypertext Transfer Protocol HTTP/1.1", RFC2616, IETF). It should be noted that in the aforementioned authentication, as the information for confirming the user himself/herself, besides the password, a public key certificate or biometric information may be used.

When performing authentication, there is a problem of spoofing, i.e., an unauthorized person illegally uses another person's identifier and password, thereby using a service. Such a spoofing generates charging which the owner of the identifier and the password does not know and a problem of leak of confidential information. When biometric information is used for authentication of a user, spoofing becomes difficult. However, authentication using biometric information requires a special device and software and its use is limited to admission control requiring strict authentication and not widely used on the network.

In general different administrators perform authentication and authorization for network connection and authentication and authorization for using a service. For this, different identifiers are used for the respective authentication processes and no inspection is performed to check whether the different identifiers belong to the same person. Accordingly, it is allowed to use a service, for example, even when the connection to the Internet is performed by using the identifier and the password validly owned by the user but another person's identifier and password are used for using the service. To cope with this, spoofing may be prevented by judging whether the user permitted to make connection to the network is the same person as the person who is going to receive a service by checking the correlation between the different identifiers. In any stage, when authentication and authorization are completed, a packet transmitted thereafter from the user includes no identifier to be used for authentication. Instead of it, it is often the case that temporary identifier valid only for the authorized use is assigned and this identifier is contained in the packet. For example, in a network using IP (Internet Protocol) such as the Internet often uses an IP address indicating the position on the network as the temporary identifier. For this, when performing authentication for using a service provided on the network using the IP, identifier used for authentication to use the service is transmitted by a packet using the IP address, assigned as a result of permission to connect to the network, as a transmission source.

Accordingly, by correlating the IP address of the transmission source of the packet with the identifier used for authentication for using a service for each of the users, it is possible to check whether the user permitted to make connection to the network is the same person as the user who is going to receive a service. For example, there is a technique for assigning an IPv6 (Internet Protocol version 6) address containing an identifier for using a service in the least significant 64 bits to a device used by a user of the network service and when using the service, the identifier for using the service presented by the user is compared to the IPv6 address so as to check whether the IPv6 address contains the user identifier (for example, JP-A-2003-132030).

However, in the current network, it is general that the correlation between the IP address and the identifier for using a service dynamically changes.

For example, in the current Internet or in the in-enterprise network, the IPv4 (Internet Protocol version 4) address is used as the IP address. Because of the address shortage in the world scale, an address which has been assigned to a user but become unnecessary for the user is assigned for another user.

Accordingly, the method disclosed in JP-A-2003-1132030 which assumes that the correlation between the IP address and the identifier for using a service is unchanged is insufficient for inspecting whether a user is the same user on the network.

SUMMARY OF THE INVENTION

It is therefore an object of the present invention to provide an access control system including:

means for holding correlation between a first identifier used in a first authentication for permitting connection to a network and a second identifier used in a second authentication for permitting use of a service;

means for holding correlation between a third identifier assigned to a user who is permitted to make connection to the network and the first identifier on the user; and means for inspecting correlation between the second identifier and the third identifier contained in the packet for the second authentication.

For details, the means for inspecting the correlation between the second identifier and the third identifier may be realized in two ways. According to the first method for realization, the means includes:

means for querying the means holding correlation between the first identifier and the third identifier and acquiring the first identifier having the correlation with the third identifier contained in the packet for the second authentication;

means for querying the means holding correlation between the first identifier and the second identifier and acquiring the second identifier having correlation with the first identifier acquired above; and means for comparing the second identifier acquired above with the second identifier contained in the packet for the second authentication.

Moreover, according to the second method for realization, the means for inspecting correlation between the second identifier and the third identifier includes:

means for querying the means holding correlation between the first identifier and the second identifier and acquiring the first identifier having the correlation with the second identifier contained in the packet for the second authentication;

means for querying the means holding correlation between the first identifier and the third identifier and acquiring the third identifier having correlation with the first identifier acquired above; and means for comparing the third identifier acquired above with the third identifier contained in the packet for the second authentication.

According to the present invention, inspection is performed on correlation between the identifier temporarily assigned when connection to a network is permitted and the identifier used for authentication for getting authorization for using a service. Accordingly, it is possible to reduce unauthorized use of a service by spoofing even in the network in which the sender's address is not constant such as in the Internet.

Other objects, features and advantages of the invention will become apparent from the following description of the embodiments of the invention taken in conjunction with the accompanying drawings.

BRIEF DESCRIPTION OF THE DRAWINGS

FIG. 2 is a table showing correlation between user IDs used for connection to a network and IP addresses assigned to the users permitted to make connection to the network.

FIG. 3 is a table showing correlation between user IDs and passwords used for connection to the network.

FIG. 4 is a table showing correlation between the user IDs used for connection to the network and user IDs used for connection to the Web server.

FIG. 5 is a table showing correlation between user IDs used for connection to the Web server and passwords.

DESCRIPTION OF THE INVENTION

Figure 1:
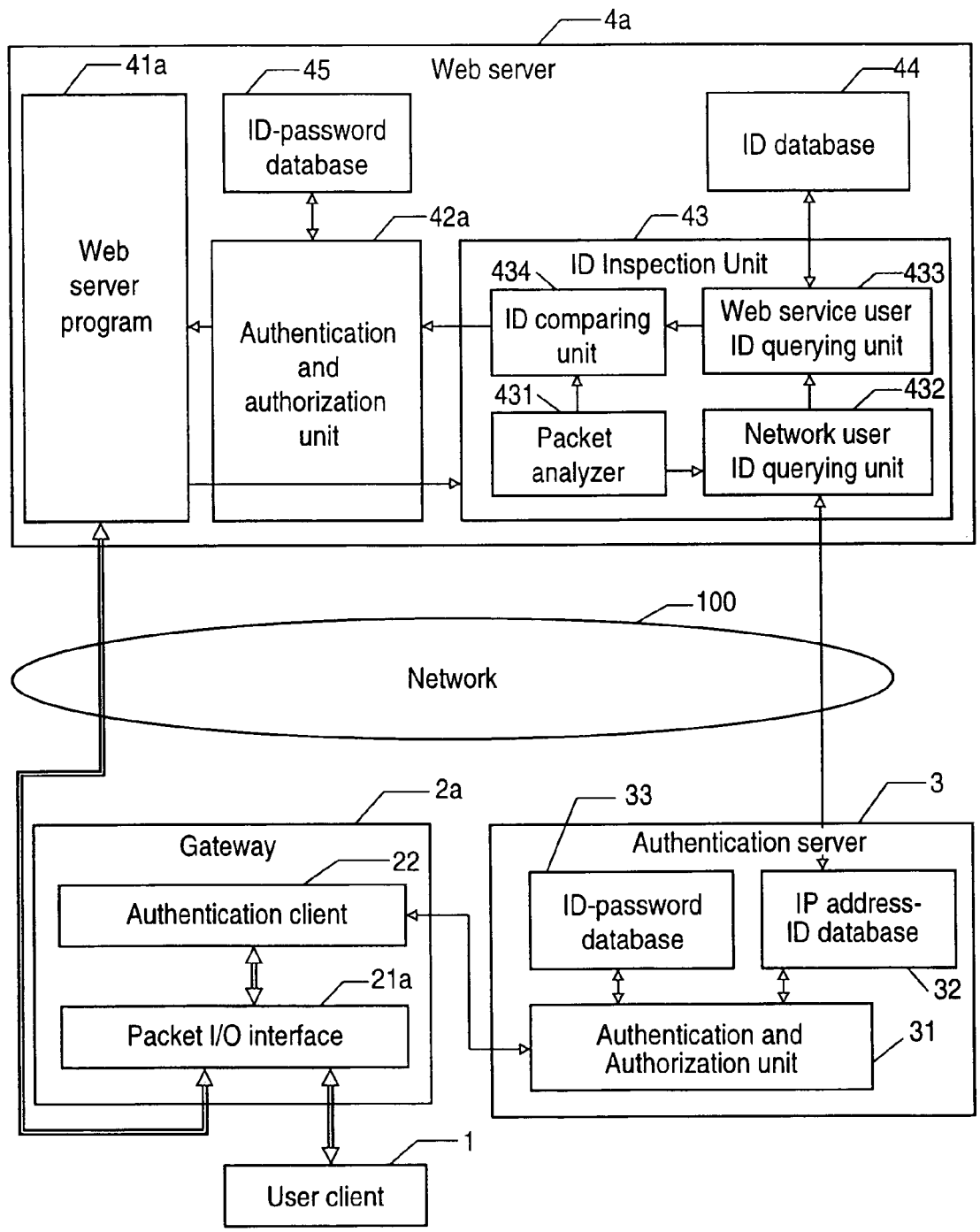
FIG. 1 is a block diagram showing configuration of an information processing system according to a first embodiment of the present invention.

FIG. 1 shows system configuration according to the first embodiment of the present invention. A user client 1 is a computer having a CPU, a memory, and a user interface. A gateway 2a is formed by a packet I/O interface 21a and an authentication client 22. The packet I/O interface 21a has a logic circuit and a memory, analyzes a header of a packet received from a network, and performs packet transfer and processing distribution to the authentication client 22 according to the analysis result. Moreover, the packet I/O interface 21a transmits a packet returned from the authentication client 22 after completion of processing, to the network. The authentication client 22 has a CPU and a memory. The authentication client 22 receives a packet containing an ID and a password for connection to the network 100, from the packet I/O interface 21a, extracts the ID and the password, and sends them to an authentication server 3. Moreover, the authentication client 22 receives a processing result from the authentication server 3, generates a response message in accordance with the content, and sends it to a user via the packet I/O interface 21a. The authentication server 3 has a CPU, a memory, a magnetic disc device, and an interface, which constitute an authentication and authorization unit 31, an IP address-ID database 32, and ID-password database 33 by operation of various software. The authentication and authorization unit 31 has a function to receive a user ID and a password inputted by the user who is going to make connection from the authentication client of the gateway to the network 100, reference the ID-password database 33 so as to compare the contents recorded in a correlation table 331, and report the result to the authentication client. Furthermore, the authentication and authorization unit 31 has a function to permit connection to the network 100, assign an IP address to the user terminal of the user, and register the IP address in the IP address-ID database 32, if the content received from the authentication client coincides with the content recorded in the correlation table 331. The IP address-ID database 32 is formed by user IDs for identifying users of the network 100, a correlation table 321 for correlating the IP addresses assigned when connection to the network 100 is permitted for the respective users, and software for reading and rewriting information from/in the correlation table 321.

Figures 2, 3:
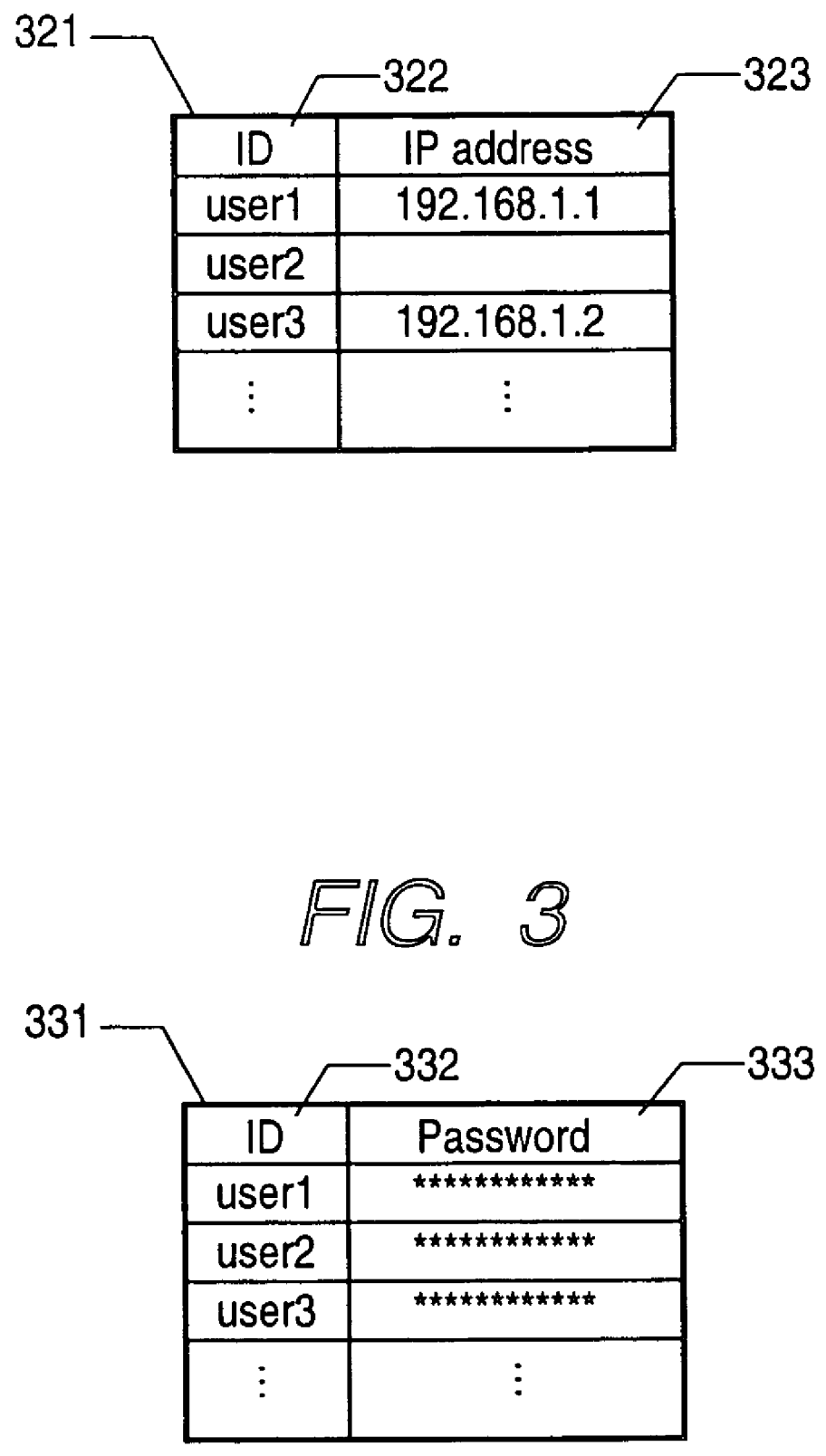

FIG. 2 shows the content of the correlation table 321. The correlation table 321 has an area 322 for recording user IDs of the users of the network 100 and an area 323 for recording IP addresses. The content of the area 323 changes each time a user starts connection to the network 100. Moreover, for the user not performing connection to the network 100, the area 323 is blank. The ID-password database 33 is formed by a correlation table 331 correlating user IDs for identifying users of the network 100 with passwords for authenticating each user, and software for reading out and rewriting information from/in the correlation table 331. By referencing the correlation table 321, it is possible to detect to which user is assigned the IP address used by the user accessing the network 100.

FIG. 3 shows a content of the correlation table 331. The correlation table 331 has an area 332 for recording user IDs of users of the network 100 and an area 333 for recording passwords. The contents of the area 333 are encrypted so as to prevent leak to other persons. The Web server 4*a* is a computer having a CPU, a memory, a magnetic disc device, and an interface and by executing various software, it implements a Web server program 41*a*, an authentication and authorization unit 42*a*, an ID inspection unit 43, an ID database 44, and an ID-password database 45. The Web server program 41*a* analyzes an HTTP packet received, generates a necessary response message, and returns it to the transmission source. When the received HTTP packet contains the ID and the password for connection to the Web server 4*a*, the Web server 4*a* passes the packet to the authentication and authorization unit 42*a* and the ID inspection unit 43 and generates a response message according to the processing result reported from these function units. The ID inspection unit 43 is formed by a packet analyzer 431, a network user ID querying unit 432, a Web service user ID querying unit 433, and an ID comparing unit 434. The packet analyzer 431 analyzes the content of the packet transmitted by the user for authentication, extracts an ID to be used for connection to the Web server 4*a*, and passes it to the ID comparing unit 434. Moreover, the packet analyzer 431 extracts the IP address of the transmission source from the same packet and passes it to the network user ID querying unit 432. The network user ID querying unit 432 asks the IP address-ID database 32 about the ID to be used for connection to the network 100 by the user to whom the IP address extracted by the packet analyzer 431 is assigned and passes the acquired ID to the Web service user ID querying unit 433. The Web service user ID querying unit 433 asks the ID database 44 about the ID used for connection to the Web server 4*a* by the user using the ID acquired by the network user ID querying unit 432 for connection to the network 100 and passes an ID acquired as a result to the Web service user ID comparing unit 434. The Web service user ID comparing unit 434 compares the ID reported from the packet analyzer 431 to the ID reported from the Web service user ID query unit 433 so as to inspect whether they coincide, and passes the inspection result to the authentication and authorization unit 42*a*. With this configuration, it is possible to judge whether the access is made from a user who is permitted to access the network 100. The authentication and authorization unit 42*a* receives a notification of the ID comparison result in the Web service user ID comparing unit 434 and, if the IDs coincide, extracts the ID and the password contained in the HTTP packet for authentication received from the Web server program 41*a*, so as to inspect whether they coincide with the contents registered in the ID-password database 45, and reports the inspection result to the Web server program 41*a*. Moreover, it they do not coincide, the authentication and authorization unit 42*a* reports that the authentication has failed to the Web server program 41*a*. With this configuration, it is possible to judge whether the user permitted to access the network 100 is a user who can receive a service provided by the server.

The ID database 44 is formed by a user ID correlation table 441 correlating user IDs for identifying users of connection to the network 100, with user IDs for identifying users of the Web server 4*a*, and software for reading out and rewriting information from/in the correlation table 441.

FIG. 4 shows the content of the correlation table 441. The correlation table 441 includes an area 442 for recording user IDs of the users of the network 100 and an area 443 for recording user IDs of the users of the Web server 4*a*.

The ID-password database 45 is formed by a correlation table 451 correlating user IDs of users of the Web server 4*a* with a password for authenticating respective users, and software for reading out and rewriting information from/in the correlation table 451.

FIG. 5 shows the content of the correlation table 451. The correlation table 451 includes an area 452 for storing user IDs of users of the Web server 4*a* and an area 453 for storing passwords. The content of the area 453 are encrypted so as to prevent leak of the information to other people.

Figure 6:
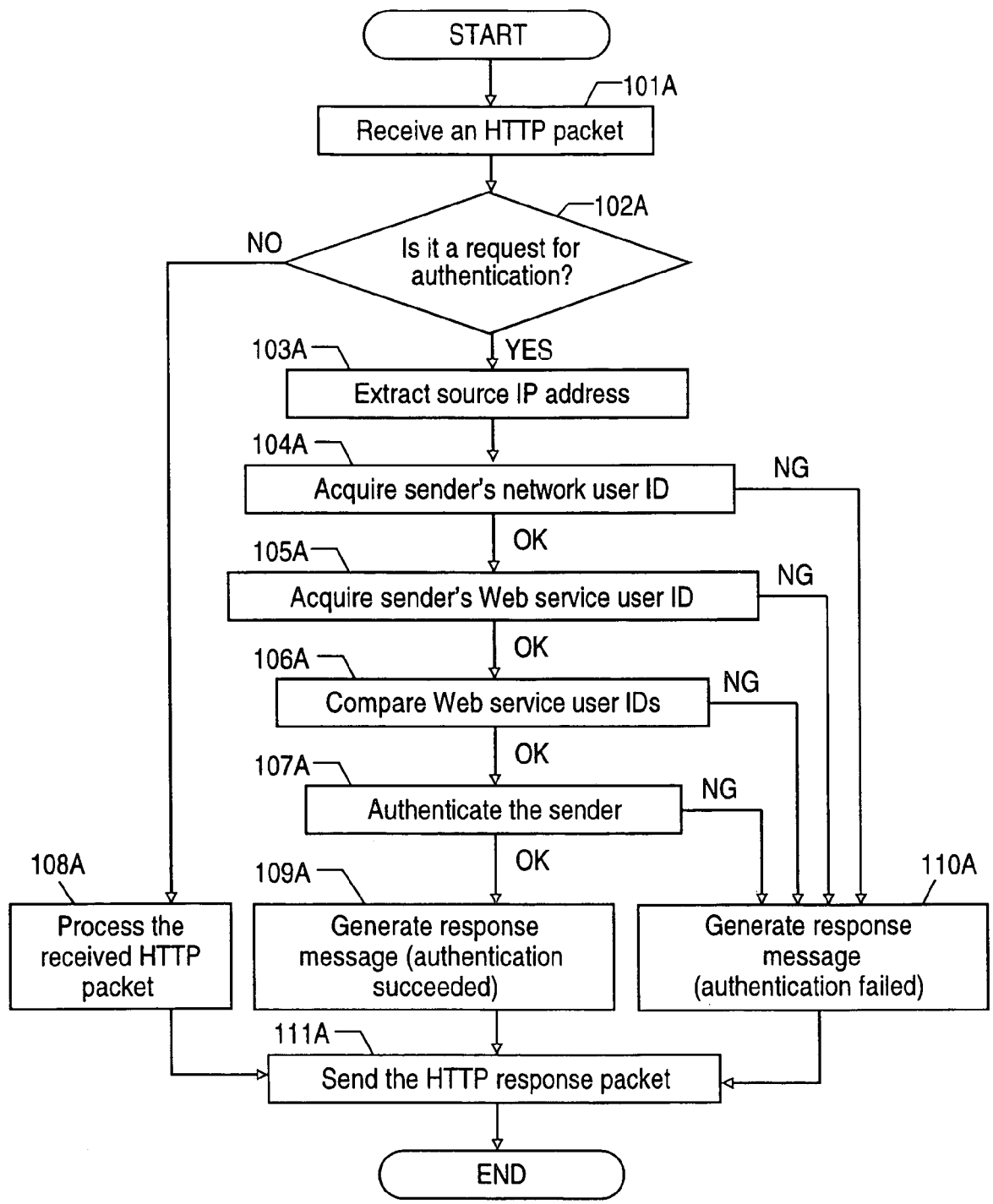
FIG. 6 is a flowchart showing an operation procedure of the Web server in the first embodiment of the present invention.

It should be noted that the Web server 4*a* can also be realized by operating a program performing processing by the procedure shown in the flowchart of FIG. 6 on the computer and does not necessarily to have the configuration of FIG. 1.

Hereinafter, explanation will be given on the flowchart of FIG. 6. When the Web server 4*a* receives an HTTP packet destined to itself (step 101A), firstly, it analyzes the content of the received packet so as to judge whether the received packet contains an ID and a password for connection to the Web server 4*a* (step 102A). If the packet does not contain an ID and a password used for connection to the Web server 4*a*, a response processing for the HTTP request is executed (step 108A) and the result is returned to the transmission source of the HTTP packet (step 111A). On the other hand, if the packet contains an ID and a password, the IP address of the transmission source and the ID used for connection to the Web server 4*a* are extracted from the received packet (step 103A). Next, the extracted IP address is used to acquire an ID used for connection to the network 100 by the user to which the address is assigned (step 104A). If the acquisition of the ID for connection to the network 100 has failed, a response message indicating that the authentication has been unsuccessful is generated (step 110A) and transmitted to the transmission source of the HTTP packet (step 111A). When the acquisition of the ID for connection to the network 100 is successful, an ID used for connection to the Web server 4*a* by the user using the acquired ID is acquired (step 105A). When the acquisition of the ID for connection to the Web server 4*a* has failed, an HTTP response message indicating that the authentication has been unsuccessful is generated (step 110A) and returned to the transmission source of the HTTP packet (step 111A). When the acquisition of the ID for connection to the Web server 4*a* is successful, the acquired ID is compared to the ID which has been extracted previously from the HTTP packet (step 106A). When the comparison results in that the IDs do not coincide, an HTTP response message indicating that the authentication has failed is generated (step 110A) and returned to the transmission source of the HTTP packet (step 111A). When the IDs coincide, authentication is performed by using the ID and the password contained in the HTTP packet (step 107A) and an HTTP response message indicating that the authentication has been successful or unsuccessful is generated according to the result (step 109A, 110A) and returned to the transmission source of the HTTP packet (step 111A).

Figure 7:
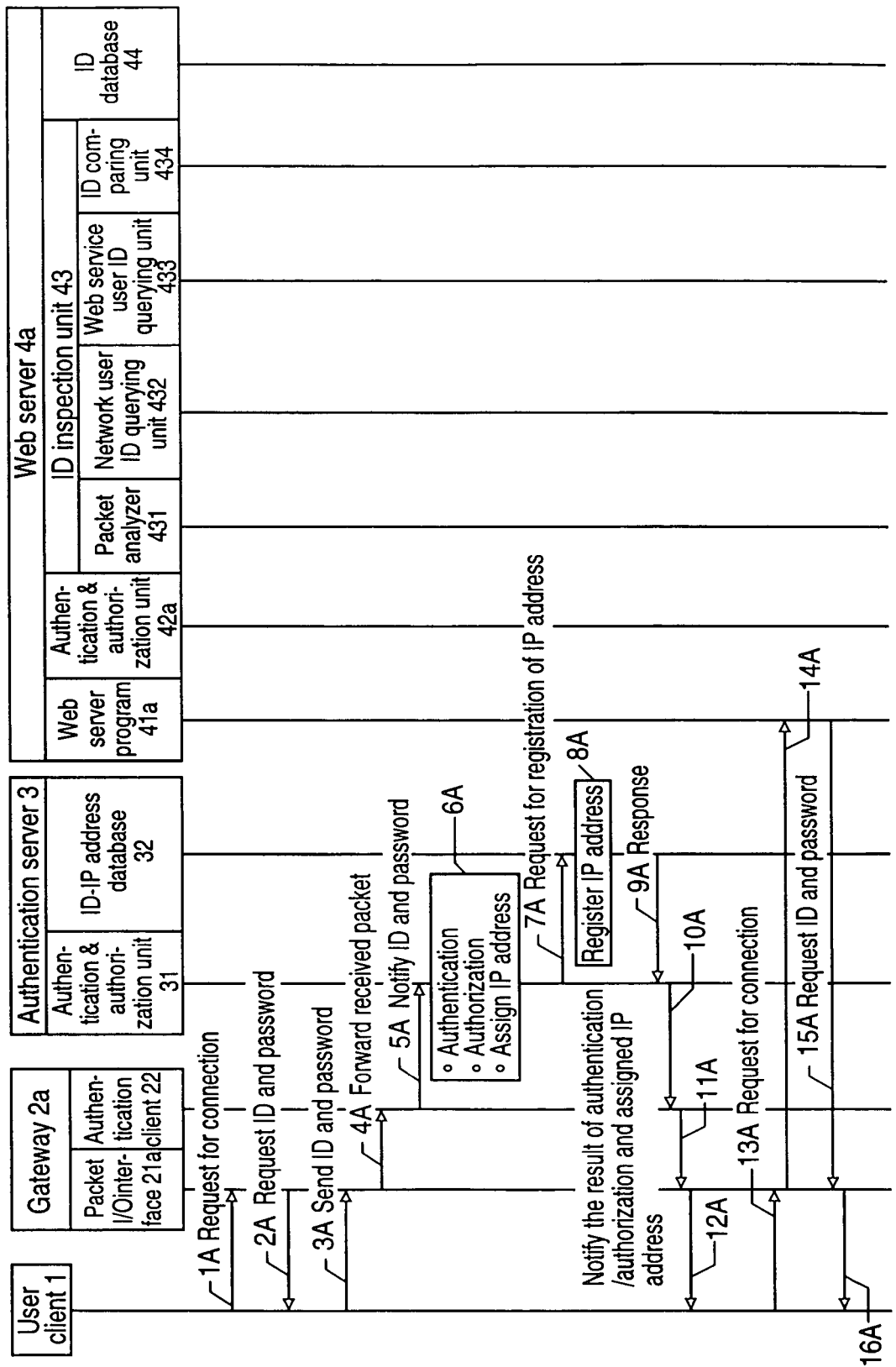
FIG. 7 shows a first section of a sequence of the operation procedure of the entire information processing system in the first embodiment of the present invention.
Figure 8:
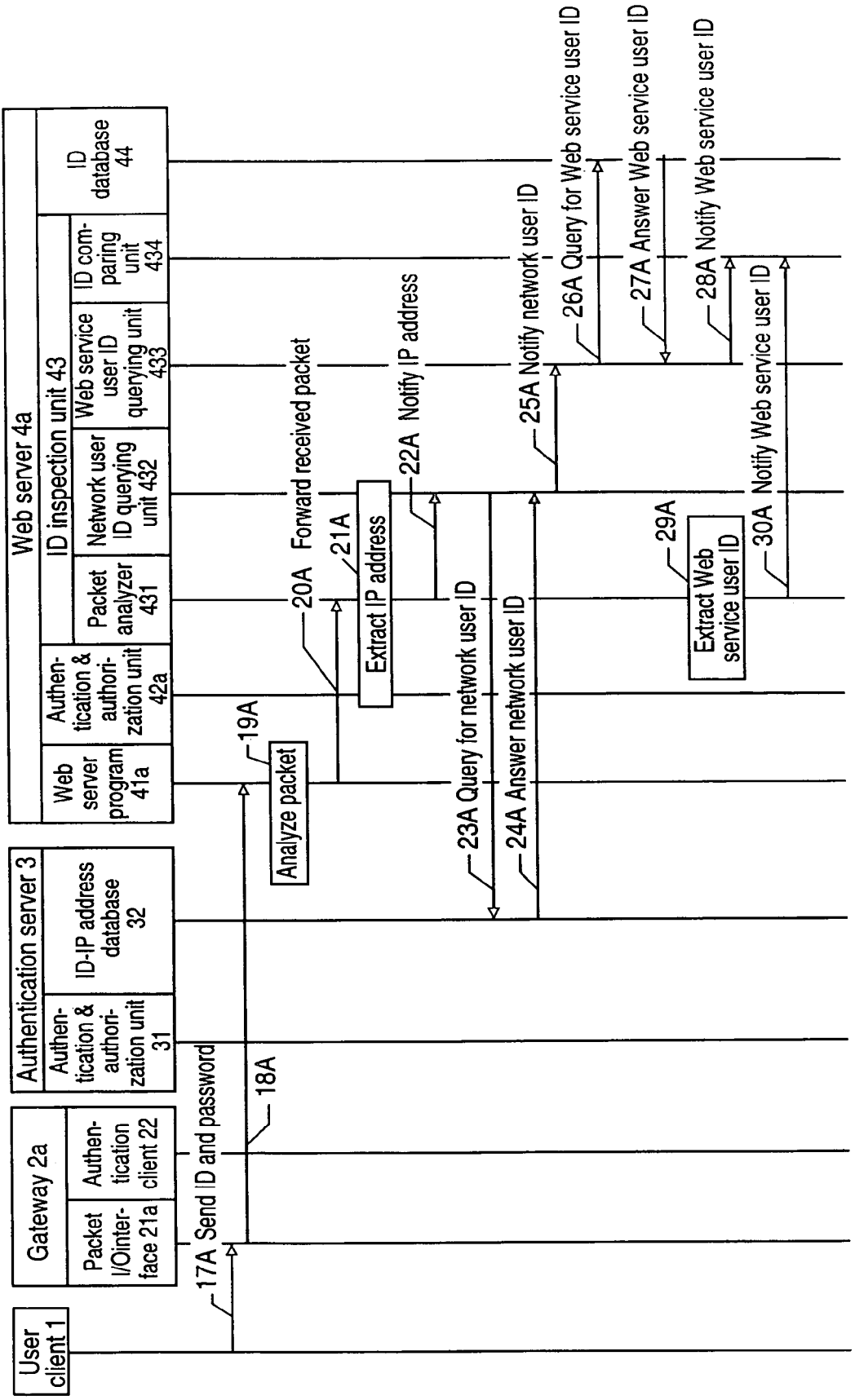
FIG. 8 shows a second section of the sequence of the operation procedure of the entire information processing system in the first embodiment of the present invention.
Figure 9:
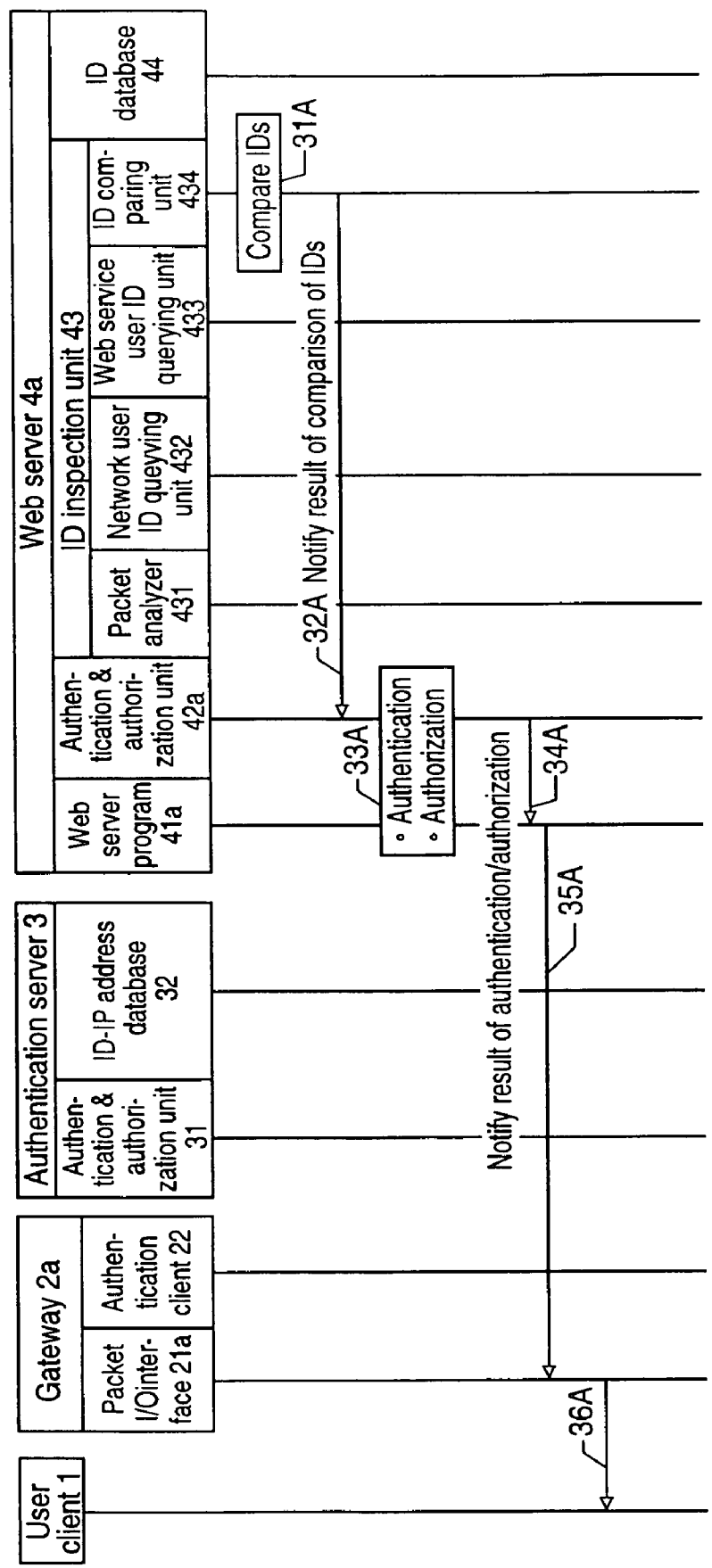
FIG. 9 shows a third section of the sequence of the operation procedure of the entire information processing system in the first embodiment of the present invention.

Hereinafter, explanation will be given on the operation of the system in the first embodiment of the present invention as shown in FIG. 1 with reference to the sequence diagram shown in FIG. 7, FIG. 8, and FIG. 9. A user who is going to connect by the user terminal 1 via the network 100 to the Web server 4a firstly performs a connection request to the gateway 2 (step 1A). The gateway 2a receives the connection request and requires the user to input a user ID and a password (step 2A). In response to this, the user inputs a user ID and a password valid for connection to the network 100. The inputted user ID and the password are packetized and transmitted from the user terminal 1 to the gateway 2 (step 3A). In the gateway 2, a packet I/O interface 21 receives the packet, judges that the packet contains a user ID and a password, and passes the packet to an authentication client 22 (step 4A). The authentication client 22 extracts the user ID and the password from the packet received and passes it to an authentication server 3 (step 5A). In the authentication server 3, an authentication and authorization unit 31 compares the user ID and the password received from the gateway 2a to the contents registered in the ID-password database 33. If both of them coincide with the contents, the user is permitted to connect to the Internet 100 via the gateway 2a. Here, the authentication and authorization unit 31 assigns an IP address to be used by the user terminal 1 to the user (step 6A). Furthermore, the value of the IP address assigned is correlated to the user ID of the assignment destination and registered in the IP address-ID database 32 (steps 7A, 8A, 9A). Next, the user who has been permitted to make connection to the network 100 makes a connection request to the Web server 4a (steps 13A, 14A). The Web server 3 receives the connection request and transmits a Web page requiring input of a user ID and a password to the user (steps 15A, 16A). In response to this, the user inputs a user ID and a password valid in connection to the Web server 4a. The user ID and the password is transmitted by an HTTP packet encrypted by the SSL (Secure Socket Layer) from the user terminal 1 to the Web server 4a (steps 17A, 18A). In the Web server 4a, a Web server program 41a receives the packet, analyzes the content (step 19A), judges that it is a packet containing the user ID and the password for authentication, and passes the packet to a packet analyzer 431 (step 20A). The packet analyzer 431 analyzes the packet, extracts the IP address of the transmission source (step 21A), and passes it to a network user ID querying unit 432 (step 22A). The network user ID querying unit 432 asks the IP address-ID database 32 (step 23A), and acquires the user ID for connection to the network 100 correlated to the IP address received from the packet analyzer 431 in step 22A (step 24A). The acquired user ID is passed to the Web service user ID querying unit 433 (step 25A). The Web service user ID querying unit 433 asks the ID database 44 (step 26A) and acquires a user ID for connection to the Web server 4a which has been correlated to the user ID for connection to the network 100 passed from the network user ID querying unit 432 in step 25A (step 27A). The acquired user ID is passed to the ID comparing unit 434 (step 28A). In parallel to steps 22A to 28A, the packet analyzer 431 analyzes the packet received in step 20A from the Web server program 41, extracts the user ID (step 29A) and passes it to the ID comparing unit 434 (step 30A). The ID comparing unit 434 compares the user ID received in step 28A from the Web service user ID querying unit 433 to the user ID received in step 30A from the packet analyzer 431 (step 31A) and reports whether both values coincide to the authentication and authorization unit 42a (step 32A). When the authentication and authorization unit 42a receives a report that the two user ID values coincide in step 32A, it performs authentication by using the user ID and the password received from the user terminal 1. Moreover, according to the authentication result, use of the service provided by the Web server 4a is authorized (step 33A) and the result is reported to the Web server program 41a (step 34A). According to the result of use authorization reported from the authentication and authorization unit 42a in step 34A, the Web server program 41a returns a response for the connection request made in steps 13A and 14A, to the user terminal 1 (steps 35A, 36A).

Figure 10:
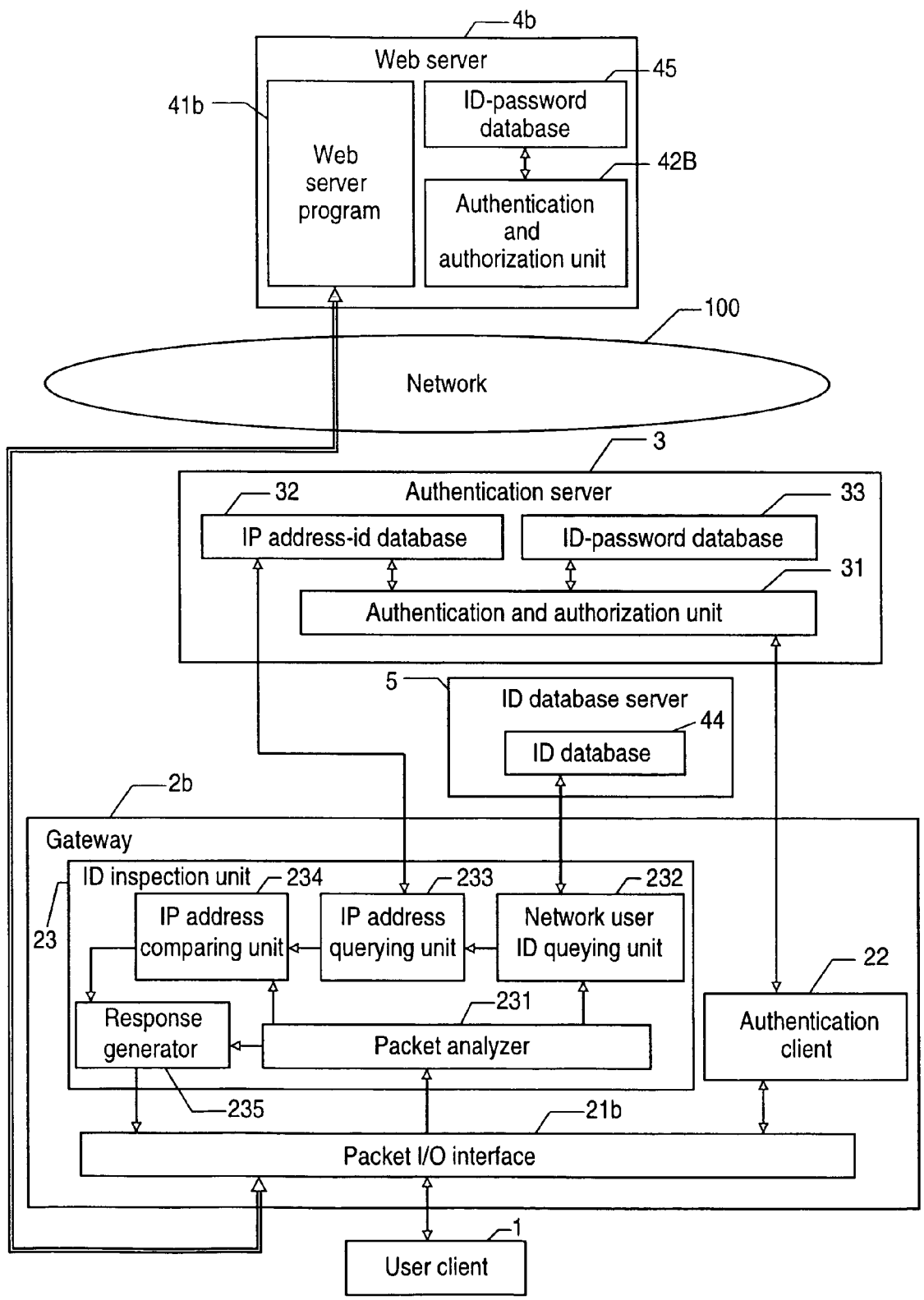
FIG. 10 is a block diagram showing configuration of an information processing system according to a second embodiment of the present invention.

FIG. 10 shows a system configuration according to a second embodiment of the present invention.

It should be noted that same components as in the first embodiment are denoted by same reference symbols and their detailed explanations are omitted. The gateway 2b is formed by the packet I/O interface 21b, the authentication client 22, and the ID inspection unit 23. The packet I/O interface 21b has a logic circuit or a CPU for analyzing a header of the packet received from the network, and, according to the analysis result, it transfers the packet and assigns a process to the authentication client 22 and the ID inspection unit 23. Moreover, the packet returned from the authentication client 22 and the ID inspection unit 23 after completion of the process is transmitted to the network.

The ID inspection unit 23 has a CPU and a memory, and by executing various software, it implements the packet analyzer 231, the network user ID querying unit 232, the IP address querying unit 233, the IP address comparing unit 234, and the response generator 235. The packet analyzer 231 analyzes the content of a packet for receiving an authentication when connecting to the Web server 4b received from the user, extracts the IP address of the transmission source, and passes it to the IP address comparing unit 234. Moreover, it extracts from the same packet an ID to be used for connection to the Web server 4b and passes it to the network user ID querying unit 232. Furthermore, it transfers the received packet to the response generator 235. The network user ID querying unit 232 asks the ID database 44 about the ID to be used for connection to the network 100 by the user using the ID for connection to the Web server 4b extracted by the packet analyzer 231 and passes the ID acquired as a result, to the IP address querying unit 233. The IP address querying unit 233 asks the IP address-ID database 32 about the IP address assigned to the user using the ID for connection to the network 100 acquired by the network user ID querying unit 232 and passes the IP address acquired as a result, to the IP address comparing unit 234. The IP address comparing unit 234 compares the IP address reported from the packet analyzer 231 to the IP address reported from the IP address querying unit 233 so as to check whether they coincide and passes the check result to the response generator 235. The response generator 235 holds the packet transferred from the packet analyzer 31. Moreover, the response generator 235 receives the IP address comparison result by the IP address comparison unit 234 and transfers the held packet to the Web server 4b if the comparison result is matched. If not matched, the response generator 235 generates a response massage indicating that the authentication has failed for the packet held and returns the message to the packet transmission source. The Web server 4b has a CPU, a memory, a magnetic disc device, and an interface. By executing various software, it implements the Web server program 41b, the authentication and authorization unit 42b, and the ID-password database 45. The Web server program 41b analyzes the packet of the HTTP received, generates a necessary response message, and returns it to the transmission source. When the packet of the HTTP received includes an ID and a password for connection to the Web server 4b, the packet is passed to the authentication and authorization unit 42b and a response message is generated according to the processing result reported from this function unit. The authentication and authorization unit 42b extracts the ID and the password contained in the HTTP packet for authentication received from the Web server program 41*b*, checks whether they coincide with the contents registered in the ID-password database 45, and reports the check result to the Web server program 41*b*. The ID database server 5 has a CPU, a memory, a magnetic disc device, and an interface, and by executing various software, it implements the ID database 44. It should be noted that the gateway 2*b* may also be implemented by executing a program performing a process according to the procedure shown in the flowchart of FIG. 11 on a computer and does not necessarily to have the configuration shown in FIG. 10.

Figure 11:
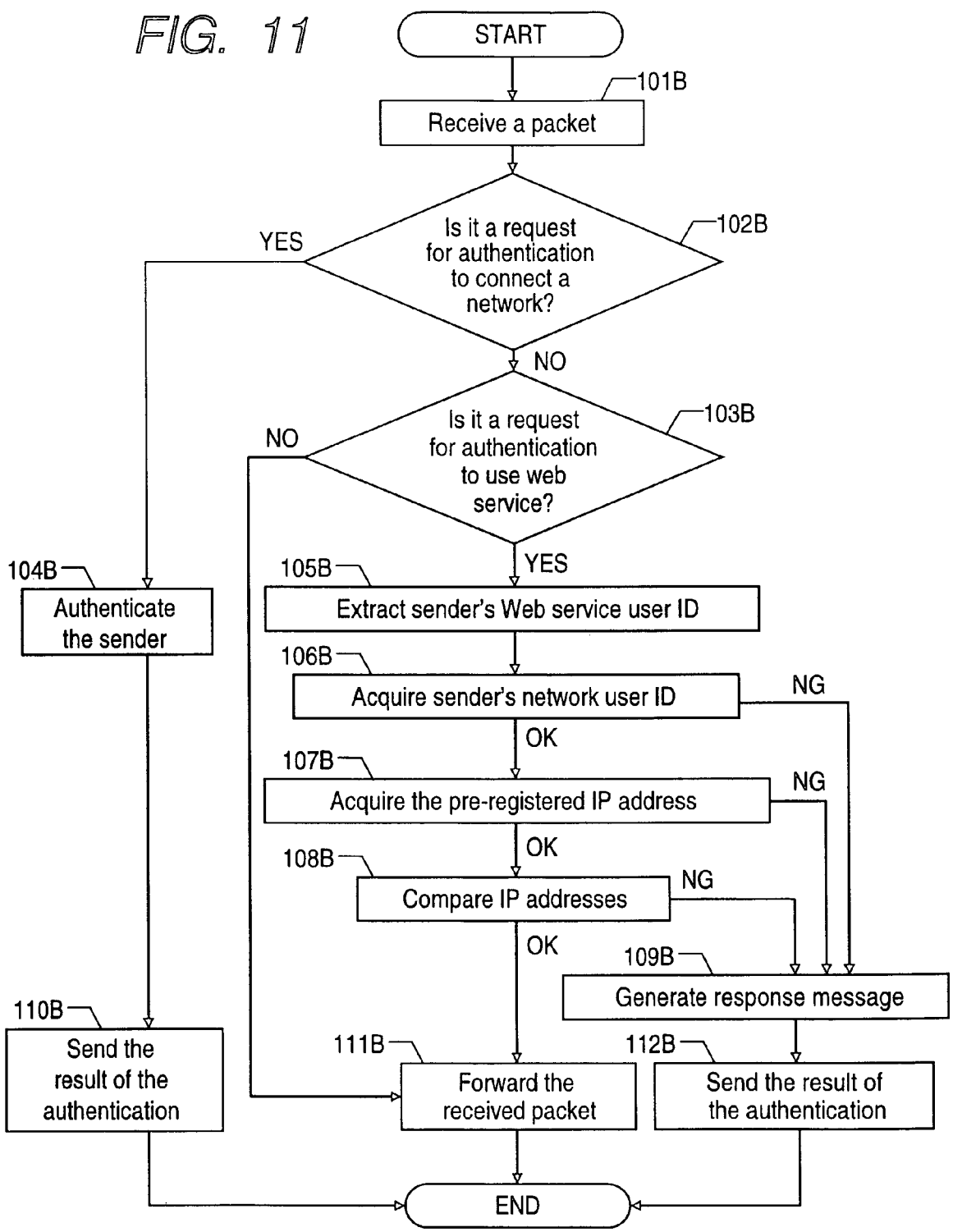
FIG. 11 is flowchart showing an operation procedure of a gateway device in the second embodiment of the present invention.

Hereinafter, explanation will be given on the flowchart of FIG. 11. When the gateway 2*b* receives a packet (step 101B), firstly, it analyzes the content of the received packet and checks whether the received packet contains an ID and a password used for connection to the network 100 (step 102B). If the packet contains the ID and the password for connection to the network 100, authentication is executed for connection to the network 100 (104B) and the result is returned to the packet transmission source (step 110B). On the other hand, if the packet does not contain an ID and a password for connection to the network 100, next, it is judged whether the packet contains an ID and a password for connection to the Web server 4*b* (step 103B). If the packet does not contain an ID and a password for connection to the Web server 4*b*, the packet is transferred to the Web server 4*b* as it is (step 111B). On the other hand, if the packet contains an ID and a password for connection to the Web server 4*b*, the IP address of the transmission source and the ID used for connection to the Web server 4*b* are extracted from the packet received (step 105B). Next, by using the ID extracted, the ID used for connection to the network 100 by the user using the extracted ID is acquired (step 106B). When the acquisition of ID for connection to the network 100 has failed, a response message is generated to indicate that the authentication has failed (step 109B) and returned to the transmission source of the HTTP packet (step 112B). When the acquisition of the ID for connection to the network 100 is successful, the IP address assigned to the user using the acquired ID is acquired (step 107B). If the acquisition of the IP address has failed, an HTTP response message is generated to indicate that the authentication has failed (step 109B) and returned to the transmission resource of the HTTP packet (step 112B). If the acquisition of the IP address is successful, the acquired IP address is compared to the IP address extracted previously from the HTTP packet (step 108B). If the comparison results in that the IP addresses do not coincide, an HTTP response message is generated to indicate that the authentication has failed (step 109B) and returned to the transmission source of the HTTP packet (step 112B). If both IP addresses coincide, the HTTP packet is transferred to the Web server 4*b* (step 111B).

Figure 12:
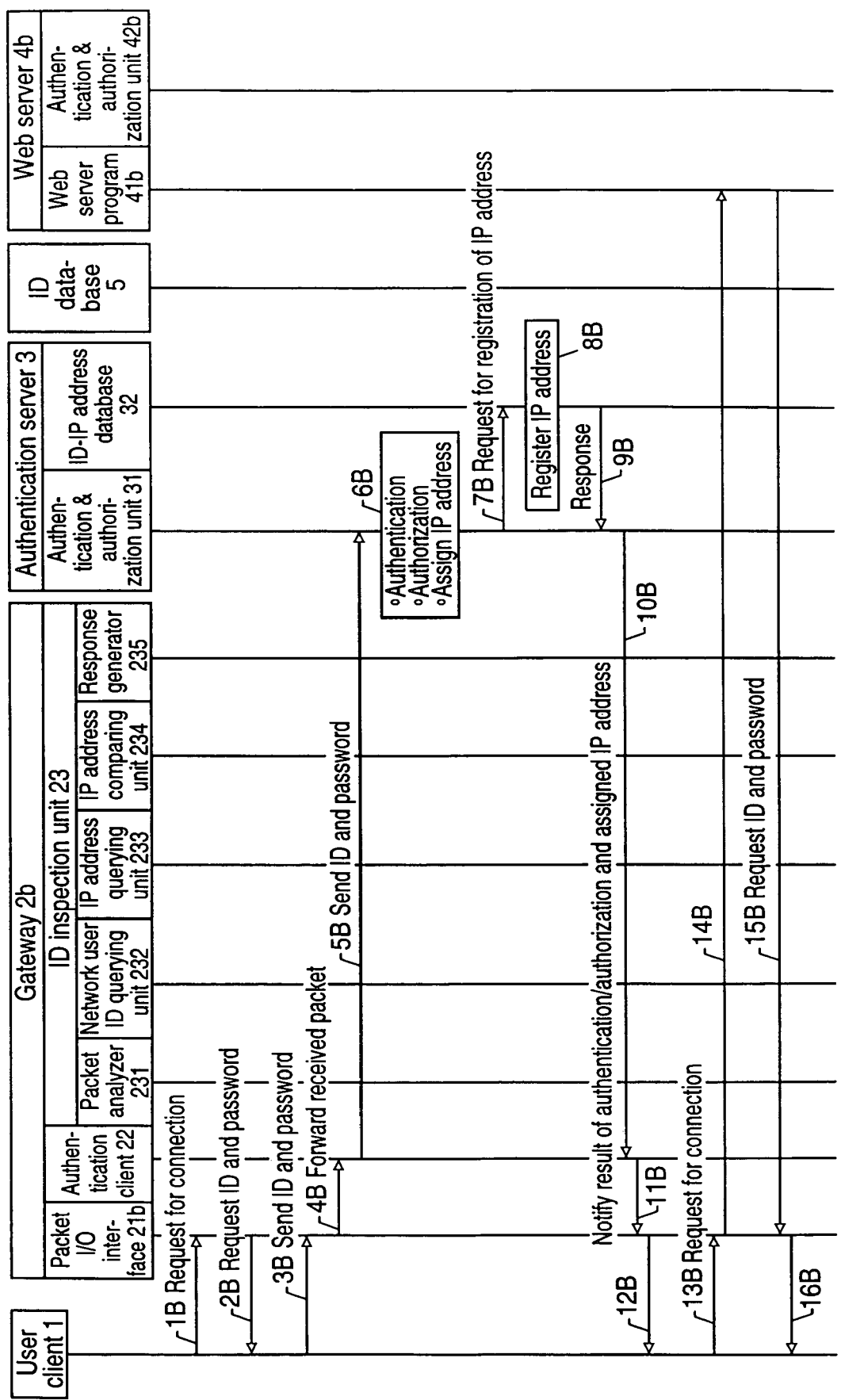
FIG. 12 shows a first section of a sequence of the operation procedure of the entire information processing system in the second embodiment of the present invention.
Figure 13:
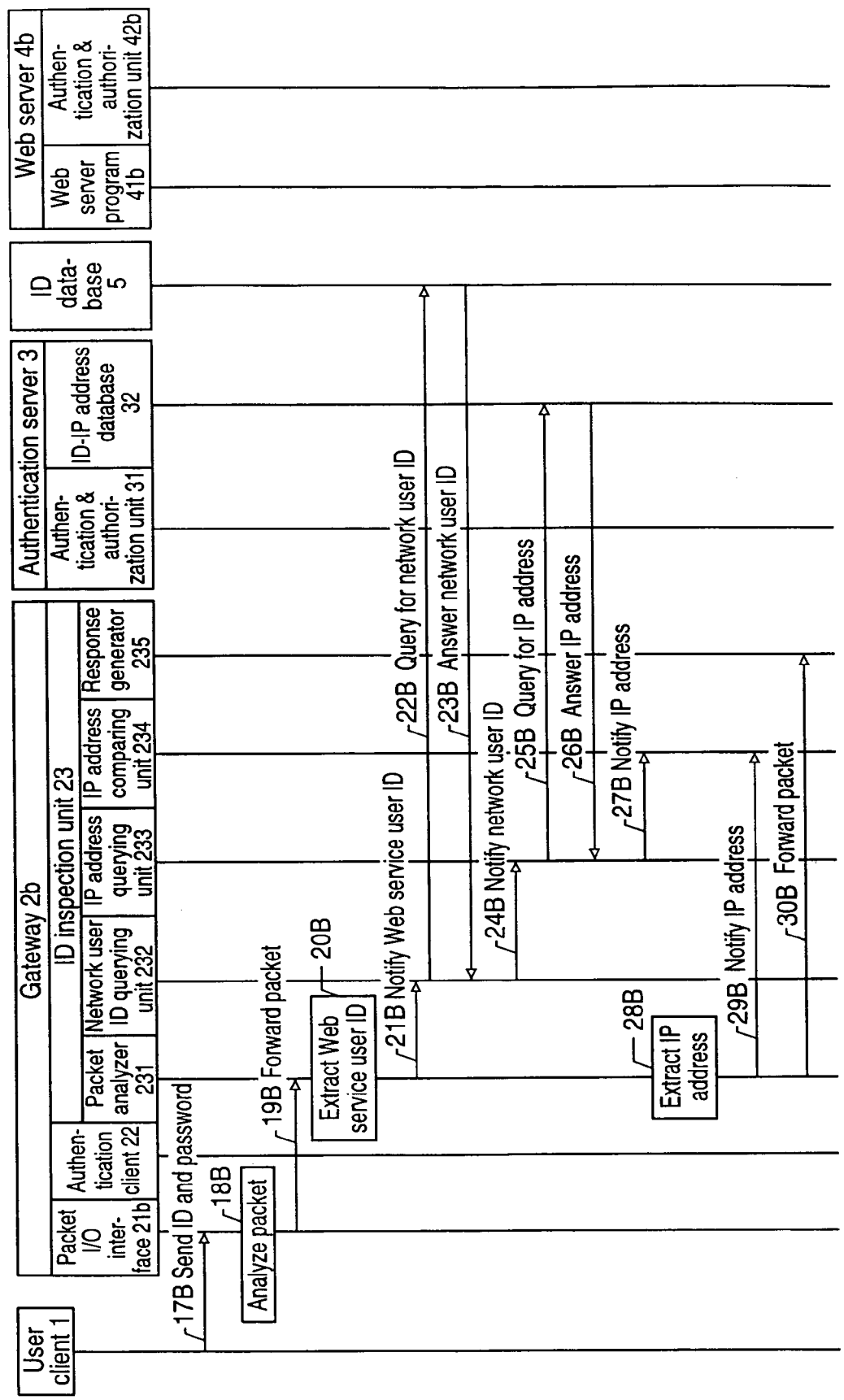
FIG. 13 shows a second section of the sequence of the operation procedure of the entire information processing system in the second embodiment of the present invention.
Figure 14:
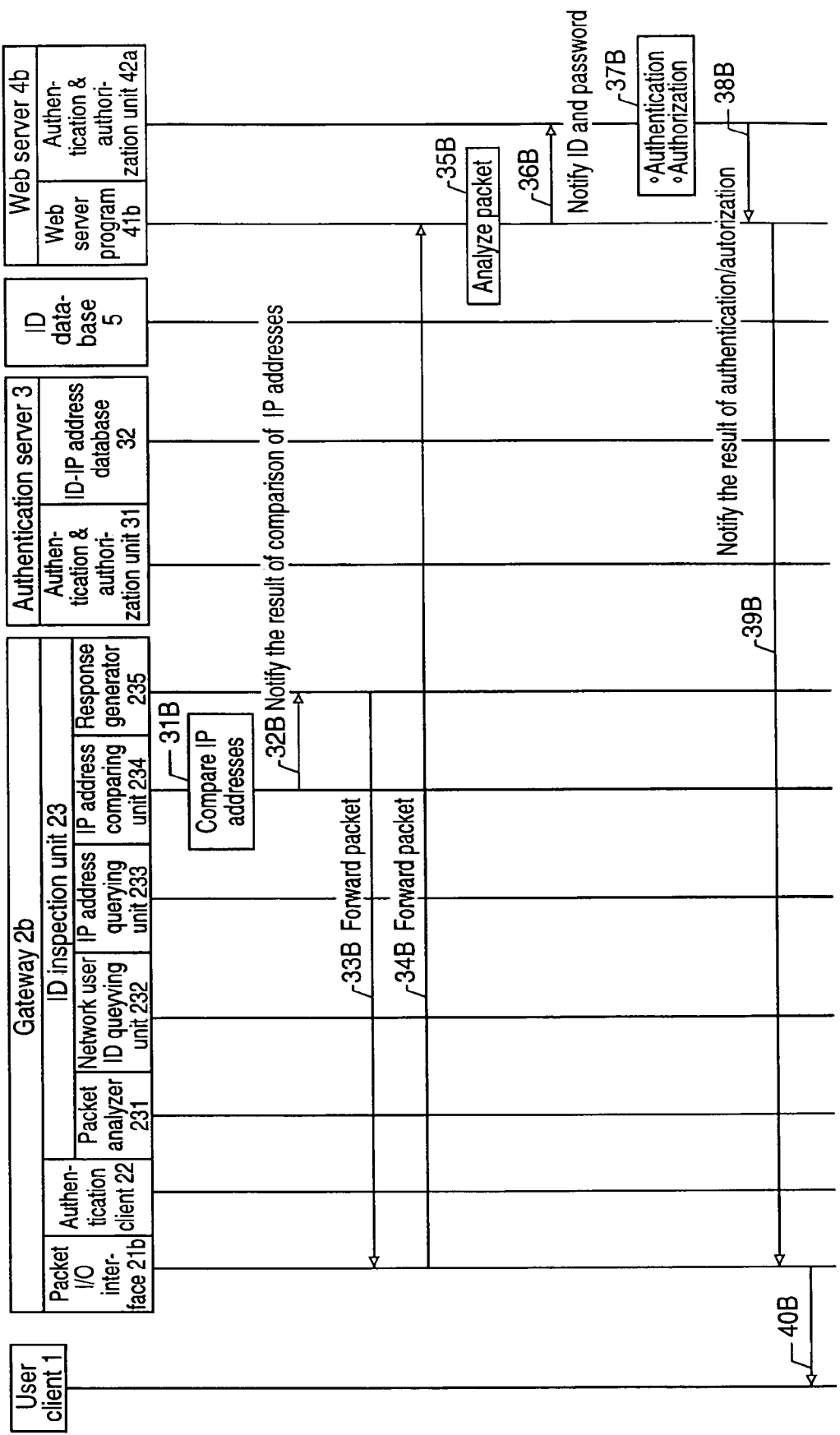
FIG. 14 shows a third section of the sequence of the operation procedure of the entire information processing system in the second embodiment of the present invention.

Hereinafter, explanation will be given on the operation of the system in the second embodiment of the present invention shown in FIG. 10, with reference to the sequence diagram shown in FIG. 12, FIG. 13, and FIG. 14. When a user wants to make connection to the Web server 4*b* via the network 100 from the user terminal 1, firstly, the user makes a connection request to the gateway 2*b* (step 1B). The gateway 2*b* receives the connection request and requires the user to input a user ID and a password (step 2B). In response to this, the user inputs a user ID and a password valid only for connection to the network 100. The user ID and the password inputted are packetized and transmitted from the user terminal 1 to the gateway 2 (step 3B). In the gateway 2*b*, the packet I/O interface 21*b* receives the packet, judges that the packet contains the user ID and the password, and passes it to the authentication client 22 (step 4B). The authentication client 22 extracts the user ID and the password from the packet received and passes them to the authentication server 3 (step 5B). The operation of the authentication server is identical to the one in the authentication server 3 in the first embodiment and its explanation is omitted here. The user who is permitted to make connection to the network 100 then makes a connection request to the Web server 4*b* (steps 13B, 14B). The Web server 4*b* receives the connection request and transmits a Web page requiring the user to input the user ID and the password (steps 15B, 16B). In response to this, the user inputs the user ID and the password valid only for connection to the Web server 4*b*. The user ID and the password are sent from the user terminal 1 to the gateway 2*b* by an HTTP packet (step 17B). In the gateway 2*b*, the packet I/O interface 21*b* receives the packet, analyzes its content (step 18B), judges that the packet contains the user ID and the password for receiving authentication in the Web server 4*b*, and passes it to the packet analyzer 231 (step 19B). The packet analyzer 231 extracts the user ID used for connection to the Web server 4*b*, included in the packet (step 20B) and passes it to the network user ID querying unit 232 (step 21B). The network user ID querying unit 232 asks the ID database 44 (step 22B) and acquires the user ID for connection to the network 100 which is correlated to the user ID for connection to the Web server 4*b* received from the packet analyzer 231 in step 21B (step 23B). The acquired user ID is passed to the IP address querying unit 233 (step 24B). The IP address querying unit 233 asks the IP address-ID database 32 (step 25B) and acquires the IP address correlated to the user ID received from the network user ID querying unit 232 in step 24B (step 26B). The acquired IP address is passed to the IP address comparing unit 234 (step 27B). In parallel to steps 21B to 27B, the packet analyzer 231 extracts the IP address of the transmission source of the packet received from the packet I/O interface 21*b* in step 16B (step 28B) and passes it to the IP address comparing unit 234 (step 29B). When the analysis in steps 21B and 28B is complete, the packet analyzer 231 transfers the packet to the response generator 235 (step 30B). The response generator 235 hold the packet received. The IP address comparing unit 234 compares the IP address received from the IP address querying unit 233 in step 27B to the IP address received from the packet analyzer 231 in step 29B (step 31B) and reports the comparison result to the response generator 235 (step 32B). When the response generator 235 receives a message that the two IP addresses have an identical value in step 32B, it transfers the packet received from the packet analyzer 231 in step 30B, to the Web server 4*b* via the packet I/O interface 21*b* (steps 33B, 34B). In the Web server 4*b*, the Web server program 41*b* receives the packet, analyzes its content (step 35B), judges that the packet contains the user ID and the password for authentication, and passes it to the authentication and authorization unit 42*b* (step 36B). The authentication and authorization unit 42*b* performs authentication by using the user ID and the password contained in the packet received in step 36B and performs authorization for using the service provided by the Web server 42*b* according to the authorization result (step 37B). Moreover, it reports the authentication and authorization result to the Web server program 41*b* (step 38B). According to the result of authorization of use reported from the authentication and authorization unit 42*b* in step 38B, the Web server program 41*b* returns a response for the connection request in steps 13B and 14B to the user terminal 1 (steps 39B, 40B). In the second embodiment of the present invention, since the gateway checks the two types of ID correlation, it is possible to directly use the existing Web server without modifying it, which is considered to be a great merit.

The present invention can be applied to a gateway and an application server as well as an information processing system including these devices and in particular, to a system in which each of the gateway and the application server requires authentication.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An access control system comprising an application server and an authentication server which are connected to a terminal,
   wherein the authentication server includes:
   a reception unit for receiving a first identifier transmitted from the terminal,
   a transmission unit for transmitting a second identifier assigned dynamically to the terminal if an authentication by the first identifier is successful, and
   a memory for storing the first identifier and the second identifier while correlating them;
   the application server includes:
   a memory for storing the first identifier and a third identifier while correlating them,
   a reception unit for receiving the second identifier and the third identifier transmitted from the terminal, and
   a transmission unit for transmitting the first identifier stored in the memory corresponding to the third identifier to the authentication server if the authentication by the third identifier is successful;
   the authentication server reads out the second identifier corresponding to the first identifier received from the application server, from the memory of the authentication server and transmits it to the application server; and
   the application server transmits a packet reporting that the authentication has been successful to the terminal if the second identifier received from the authentication server coincides with the second identifier received from the terminal.

2. An access control system as claimed in claim 1, wherein the first identifier is used for accessing a network connected to the application server, and
   the third identifier is used for receiving a service from the application server.

3. An access control system comprising an application server and an authentication server which are connected to a terminal,
   wherein the authentication server executes a first authentication for authorizing the terminal to access the network connected to the application server,
   the application server executes a second authentication for authorizing the terminal permitted to access the network by the first authentication, to use the service, and
   the access control system further comprises:
   first information holding means for holding information on correlation between the first identifier used for the first authentication and the second identifier used for the second authentication,
   second information holding means for holding information on correlation between a third identifier assigned dynamically to the terminal permitted to access the network by the first authentication and added to a packet transmitted from the terminal, and a first identifier used by the terminal,
   first information acquisition means for asking the second information holding means and acquiring a first identifier having a correlation with the third identifier contained in the packet for the second authentication,
   second information acquisition means for asking the first information holding means and acquiring a second identifier having a correlation with the first identifier acquired by the first information acquisition means, and
   first information comparing means for comparing the second identifier contained in the packet for the second authentication to the second identifier acquired by the second information acquisition means.

4. An access control system as claimed in claim 3, the system comprising:
   third information acquisition means, instead of the first information acquisition means, for asking the first information holding means and acquiring the first identifier having a correlation with the second identifier contained in the packet for the second authentication,
   fourth information acquisition means, instead of the second information acquisition means, for asking the second information holding means and acquiring the third identifier having a correlation with the first identifier acquired by the third information acquisition means, and
   second information comparing means, instead of the first information comparing means, for comparing the third identifier contained in the packet for the second authentication to the third identifier acquired by the fourth information acquisition means.

5. An authentication server connected to a terminal and an application server, the authentication server comprising:
   a reception unit for receiving a first identifier transmitted from the terminal,
   a transmission unit for transmitting a second identifier assigned dynamically to the terminal if an authentication by the first identifier is successful, and
   a memory for storing the first identifier and the second identifier while correlating them,
   wherein the reception unit receives from the application server, the first identifier corresponding to the third identifier transmitted from the terminal to the application server, and
   the transmission unit reads out from the memory, the second identifier corresponding to the first identifier received from the application server and transmits it to the application.

6. An authentication server as claimed in claim 5, wherein the first identifier is used for accessing the network connected to the application server, and
   the third identifier is used for receiving a service from the application server.

7. An application server connected to a terminal and an authentication server and comprising:
   a reception unit for receiving a second identifier assigned dynamically if an authentication by the authentication server is successful and a third identifier from the terminal after the terminal has transmitted a first identifier to the authentication server,
   a memory for storing the first identifier and the third identifier while correlating them, and
   a transmission unit for transmitting the first identifier stored in the memory and corresponding to the third identifier to the authentication server if the authentication by the third identifier received is successful,
   wherein if the second identifier corresponding to the first identifier stored in the memory and received from the authentication server coincides with the second identifier received from the terminal, a packet reporting the successful authentication is transmitted to the terminal.

8. An application server as claimed in claim 7, wherein the first identifier is used for accessing a network connected to the application server, and the third identifier is used for receiving a service from the application server.

9. An access control system comprising a packet transfer device, an application server, and an authentication server which are connected to a terminal, the authentication server including:

a reception unit for receiving a first identifier transmitted from the terminal, a transmission unit for transmitting a second identifier assigned dynamically to the terminal if an authentication by the first identifier is successful, and a memory for storing the first identifier and the second identifier while correlating them, and the packet transfer device including:

a memory for storing the first identifier and a third identifier while correlating them, a reception unit for receiving the second identifier and the third identifier transmitted from the terminal to the application server, and a transmission unit for transmitting the first identifier stored in the memory and corresponding to the third identifier received to the authentication server, wherein the authentication server reads out from the memory of the authentication server, the second identifier corresponding to the first identifier received from the packet transfer device and transmits it to the packet transfer device, the packet transfer device transmits the second identifier and the third identifier received from the terminal, to the application server, if the second identifier received from the authentication server coincides with the second identifier received from the terminal, and the application server transmits a packet reporting successful authentication to the terminal if the authentication by the second identifier received from the packet transfer device is successful.

10. A packet transfer device connected to a terminal, an application server, and an authentication server and comprising:

a reception unit for receiving a second identifier assigned dynamically if an authentication by the authentication server is successful and a third identifier from the terminal after the terminal has transmitted a first identifier to the authentication server, a memory for storing the first identifier and the third identifier while correlating them, and a transmission unit for transmitting the first identifier stored in the memory and corresponding to the third identifier received to the authentication server, wherein if the second identifier corresponding to the first identifier received from the authentication server coincides with the second identifier received from the terminal, the second identifier and the third identifier received from the terminal are transmitted to the application server.

* * * * *

UNITED STATES PATENT AND TRADEMARK OFFICE
CERTIFICATE OF CORRECTION

PATENT NO. : 7,660,995 B2  Page 1 of 1
APPLICATION NO. : 11/202286
DATED : February 9, 2010
INVENTOR(S) : Takeuchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this

Thirtieth Day of November, 2010

David J. Kappos
*Director of the United States Patent and Trademark Office*